United States Patent [19]

Wolfe

[11] Patent Number: 4,876,625
[45] Date of Patent: Oct. 24, 1989

[54] COMPOSITE CIRCUIT BREAKER SYSTEM

[75] Inventor: William R. Wolfe, Penn Hills, Pa.

[73] Assignee: Westinghouse Electric Corp., Pittsburgh, Pa.

[21] Appl. No.: 267,133

[22] Filed: Nov. 4, 1988

[51] Int. Cl.⁴ ............................................. H02H 3/08
[52] U.S. Cl. ........................................ 361/93; 361/63
[58] Field of Search ..................... 361/62, 63, 67, 87, 361/93

[56] References Cited

U.S. PATENT DOCUMENTS

| 3,689,801 | 9/1972 | Engel et al. | 361/96 |
| 3,852,660 | 12/1974 | Maier et al. | 324/424 |
| 3,924,160 | 12/1975 | Maier et al. | 361/94 |
| 4,439,803 | 3/1984 | Baba | 361/67 X |
| 4,476,511 | 10/1984 | Saletta et al. | 361/67 X |
| 4,541,031 | 9/1985 | Ibbetson | 361/67 |

OTHER PUBLICATIONS

Network Balancing Transformer, by R. E. Powers, The Electric Journal, Feb. 1932, pp. 89-92.

Primary Examiner—Derek S. Jennings
Attorney, Agent, or Firm—M. J. Moran

[57] ABSTRACT

A composite circuit breaker includes a plurality of circuit breaker modules inserted in paralleled branches of the main conductor. The branch phase currents associated with each breaker module and a signal representative of the total currents in the main conductor are auctioneered to select the largest of the current for application to the trip circuit of the breaker to provide protection for the individual breakers against current hogging while composite protection is provided for the load/source. The signal representative of each phase of the total current is generated by a primary current transformer which feeds series connected auxiliary current transformers each of which is associated with one of the individual breakers.

12 Claims, 3 Drawing Sheets

COMPOSITE CIRCUIT BREAKER SYSTEM

BACKGROUND OF THE INVENTION

1. Field of the Invention

This invention relates to a circuit breaker system comprising a plurality of modular circuit breakers which are connected in paralleled branches of a main conductor to protect equipment carrying currents greater than the current rating of the individual circuit breakers. The invention includes modular breakers which are responsive to overcurrents in the individual branch protected by the modular breaker in addition to any overcurrent in the main conductor. The invention further relates to auctioneering the branch current and a current representative of the total current in the main conductor and to reducing the burdens on the sources of such auctioneered currents.

2. Background Information

Typically, an electric distribution system is protected by a main circuit breaker to disconnect the entire distribution system from the source, and a hierarchy of progressively smaller breakers protecting the various branches of the system. The circuit breakers at the source end of the system are designed to withstand overcurrents for a period of time to allow the branch circuit breakers to operate and hopefully isolate the fault without shutting down the entire system. Thus, the main breaker must be able to carry large currents indefinitely and withstand even higher currents for short periods of time. Such breakers are expensive to build and especially so since the market for such large units is small.

In addition, if the main breaker is out of service, the entire distribution system is inoperative. Another drawback of such large main breakers is their size. Not only are they heavy to move, but they can be difficult to remove for replacement. For instance, in a submarine, the main breaker will not fit through the hatch.

There have been applications in which medium voltage breakers have been paralleled to protect equipment from large currents. In these prior art installations, the paralleled breakers are controlled solely by a control signal representative of the total current to be interrupted by the breakers. No protection is provided for the current carried by the individual breakers. This can result in overloading of an individual breaker, since it is very difficult to evenly distribute the total current between the paralleled breakers. In such systems, equalization of the currents is attempted by passive means such as matching as closely as possible the physical parameters of the paralleled circuits incorporating the individual breakers, or by active means such as by using balancing current transformers. The passive techniques achieve limited success in balancing the currents and the active methods add cost and complexity to the system.

It is known to auctioneer direct currents to select the largest current. One technique for auctioneering dc currents is disclosed in U.S. Pat. No. 3,689,801 where series connected dc current sources are each shunted by a diode poled to be forward biased by the other current sources. Ac currents are auctioneered to select the largest current by connecting in series the dc terminals of full wave rectifier bridges which convert the ac signals to unidirectional signals. U.S. Pat. Nos. 3,852,660 and 3,924,160 disclose circuit breakers in which the phase currents of a three phase power line are auctioneered using series connected full wave rectifier bridge circuits to trip the breaker on the phase current having the greatest instantaneous magnitude.

Despite these developments, There remains a need for a system in which circuit breakers can be paralleled and respond to overloads in total current while also being protected against overloads in the current flowing through the breaker.

There is also a need for such a circuit breaker system which is modular such that individual units can be selectively removed or replaced.

There is an additional need for such a circuit breaker system in which the individual breakers are responsive to the largest of the total and branch phase currents.

SUMMARY OF THE INVENTION

These and other needs are met by the invention which comprises a composite circuit breaker system in which a plurality of separate circuit breakers are connected to interrupt the current in a plurality of paralleled branches of a main conductor. Each of the circuit breakers is responsive to both a signal representative of the current in the branch in which it is connected and to a signal representative of the total current so that the individual circuit breakers are protected from current hogging while providing composite protection for the main conductor. The distribution system, and hence the circuit breakers may be single phase or multi-phase.

The branch current or phase currents and the signal representative of the total current for the one or more phases are auctioneered high by rectifier bridge circuits which are connected in series and poled to provide unidirectional currents of the same sense. Preferably, the rectifier bridge circuits for the signals representative of the total current are shunted by a diode, which while not interfering with the auctioneering of the current signals, reduces the burden on the branch current signal sources which are typically integral with the circuit breaker and are of limited capacity. Actually, if desired, the rectifier bridge circuits for the branch current signals can also be shunted by a diode to reduce the burden on the sources for the signal representative of the total current.

The signal representative of the total current provided to each circuit breaker is generated by a total current transformer and a series of auxiliary current transformers connected in series which each generate a signal representative of the total current signal for one of the circuit breakers.

The modular construction of the composite circuit breaker system has many advantages. Rather than having to build a costly large circuit breaker for the few installations where such a unit is required, a number of high volume, lower cost, medium size breakers can be used in parallel. The redundancy of the composite breaker system also provides continued service, perhaps requiring some load shedding, when individual units fail or are removed for maintenance or inspection. This is better, however, than having the entire system down as in the case of one large main circuit breaker. By making the individual circuit breakers used in the composite breakers interchangeable with the feeder and/or tie breakers used in the distribution system, a great many options are available in providing continued service to at least a portion of the system when any of the breaker units are out of service. This standardization of the breaker units also has economic advantages.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
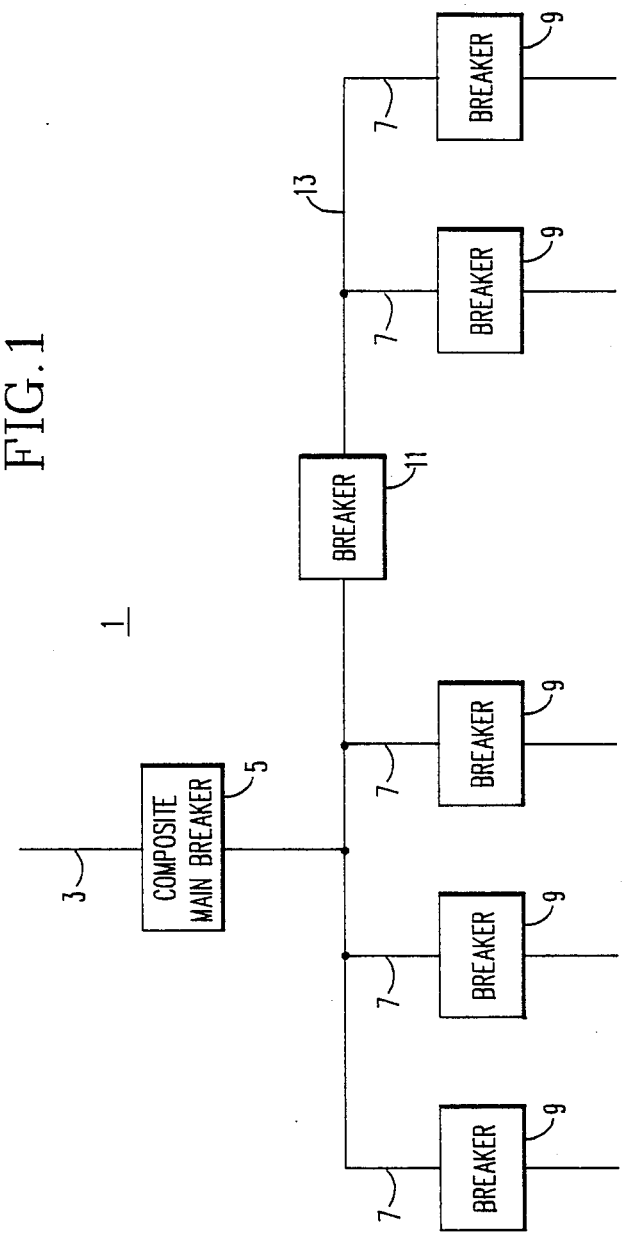
FIG. 1 is a schematic diagram in block form of a portion of an electric power distribution system incorporating the composite circuit breaker system of the invention.

FIG. 1 illustrates a typical electric power distribution system in which the invention may be applied. The distribution system 1 which may be a single phase or multi-phase system, includes a main conductor 3 protected by main breaker 5 which may be a composite circuit breaker in accordance with the invention. The main conductor provides current to a number of feeder lines 7, each protected by its own circuit breaker 9. A tie breaker 11 provides further protection to feeder lines 7 connected to a line 13 which may be connected to an alternate source (not shown). In the distribution system of FIG. 1 the main breaker 5 must be able to handle the continuous load current drawn by all of the feeder lines 7. In order to protect the main conductor 3, the main breaker 5 must trip when the total current exceeds a prescribed limit. It is also important with such a pyramid-like distribution system, that the main breaker 5 be able to withstand overcurrents for a period of time sufficient to permit the breakers 9 and 11 lower in the hierarchy to trip if required. This prevents shutdown of the entire system if there is a fault in a single feeder line or in a tie line.

The primary object of the present invention is to provide a main breaker 5 which is made up of a number of paralleled circuit breaker of moderate current rating in place of a single breaker large enough to handle the total current drawn by the distribution system. In the ideal system, the composite main breaker 5 is made up of a number of smaller breakers identical to the breakers 9. Under these circumstances, if one of the breakers of the composite system fails or is removed for maintenance, a portion of the load can be shed and the remainder of the system can remain in operation. It would even be possible, to replace the out of service breaker in the composite breaker 5 with one of the feeder breakers 9.

Figure 2:
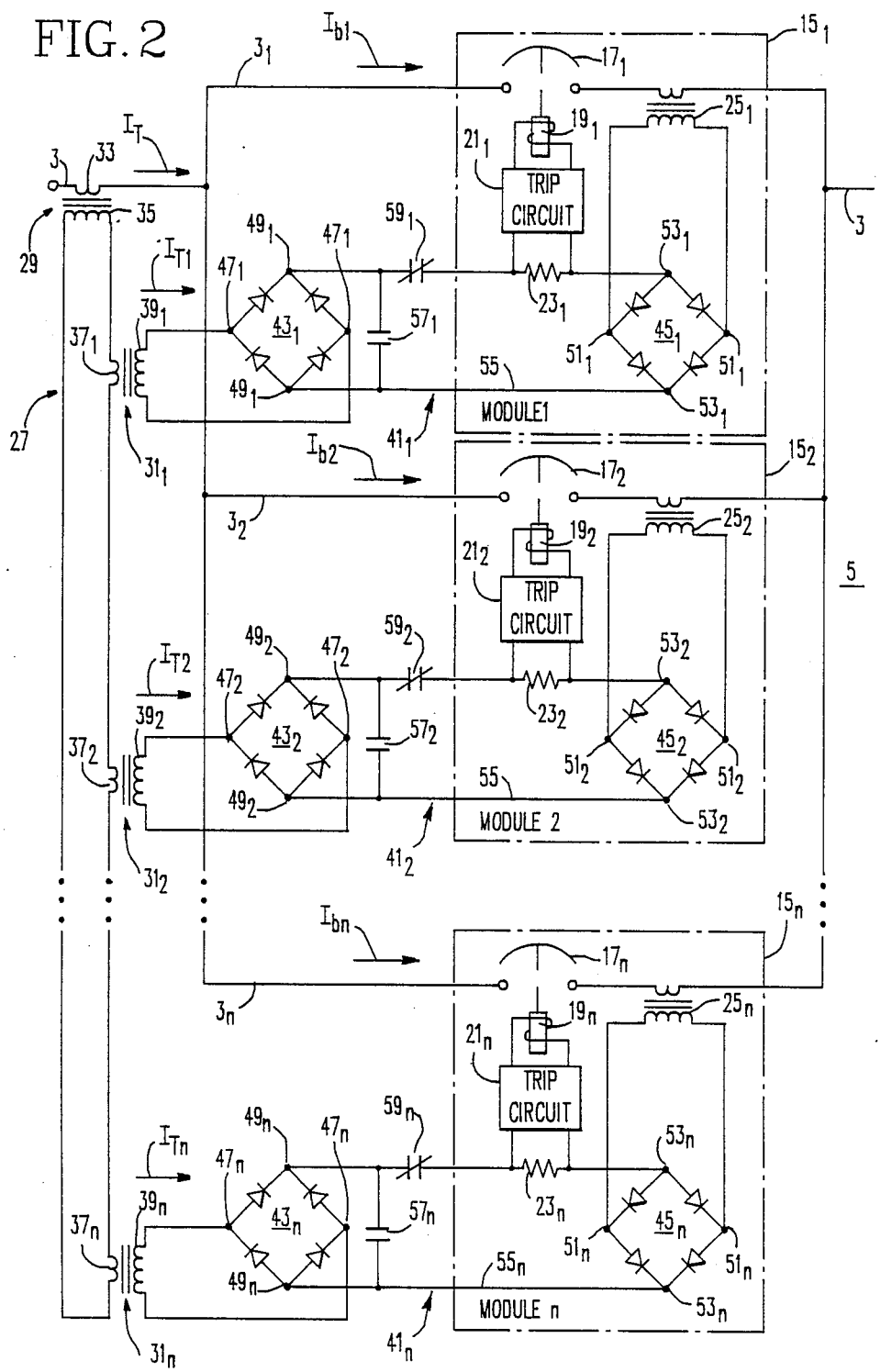
FIG. 2 is a schematic circuit diagram of a single phase composite breaker system in accordance with the invention.

FIG. 2 illustrates one embodiment of a composite main circuit breaker 5 in accordance with the invention. The single phase main conductor 3 is divided into a plurality of branch conductors $3_1$, $3_2$, to $3_N$. In each of these branch conductors is a circuit breaker $15_1$, $15_2$ to $15_n$. The number of circuit breakers 15, and hence the number of branch conductors $3_n$ is selected such that the total current $I_T$ in the main conductor 3 is divided into branch currents $I_{b1}$ to $I_{bn}$, which are less than the rated currents of the circuit breakers 15. It is important to understand that while the total current is divided into branch currents which are within the current rating of the individual circuit breakers 15, each of the individual circuit breakers must be able to properly perform interruption of the total current $I_T$. This is so because even though all the breakers respond to the total current, as a practical matter they will not trip at the same instant, and thus the last breaker must be able to perform maximum fault interruption. Another consideration is the composite breaker's ability to achieve the required withstand capability in order to assure proper coordination with the breakers 9 and 11. This condition is most probably assured by providing that the individual breakers share reasonably equal load currents. Passive techniques of load sharing, such as equalizing the length, size and configuration of the branch conductors should provide such reasonably equal load sharing.

Each of the circuit breakers 15 include main contacts 17 which interrupt the associated branch current $I_{b1}$ to $I_{bn}$. The contacts 17 are operated by a trip mechanism which may include a solenoid 19 as shown in FIG. 2. Alternatively, the contacts may be actuated by a flux transfer shunt trip device. In either case, the trip device is controlled by a trip circuit 21. The trip circuit 21 responds to a voltage developed across a sensing resistor 23 by a current proportional to the larger of the total current $I_T$ and the branch current $I_B$, as will be more fully discussed below. In the case of the trip solenoid 19, the trip circuit 21 is powered by a station battery. Typically, in circuit breakers using the flux transfer shunt trip device, the trip circuit 21 is usually powered by the current which also flows through the sensing resistor 23, as is well known.

Each of the circuit breakers 15 is supplied with a current representative of the associated branch current $I_b$ by a current transformer 25 connected in the branch conductor $3_n$. Each circuit breaker is also provided with a total current signal $I_{T1}$ to $I_{Tn}$ representative of a scaled value of the total current $I_T$. These signals representative of the total current are generated by a module 27 which includes a total current transformer 29 and a plurality of auxiliary current transformers $31_1$ to $31_n$ one for each of the circuit breakers 15. The primary winding 33 of the total current transformer 29 is connected in the main conductor 3 and the secondary winding 35 of the main current transformer 29 is connected in series with each of the primary windings 37 of the auxiliary current transformers 31. The signals representative of the total current $I_{T1}$ to $I_{Tn}$ are generated in the secondary windings $39_1$ to $39_n$ of the auxiliary current transformers 31. By making the auxiliary current transformers 31 identical, the signals representative of the total current signal generated in each secondary winding 39 represents the same scaled value of the total current $I_T$.

The branch current signal and the signal representative of the total current associated with each circuit breaker are auctioneered by an auctioneering circuit 41 which applies the larger of the two currents to the sensing resistor 23. The auctioneering circuit includes full wave rectifier bridge circuits 43 and 45 which convert the alternating total current and branch current signals respectively into dc currents. Each full wave rectifier bridge circuit 43 includes a pair of ac terminals 47 to which the associated signal representative of the total current is applied and a pair of dc terminals 49. Similarly, the full wave rectifier bridge circuits 45 include ac input terminals 51 to which the secondary of the associated branch current transformer 25 are connected and a pair of dc output terminals 53. The dc terminals of the bridge circuits 43 and 45 for each branch are connected in series with each other by lead 55 and with the sensing resistor 23. The diodes of the rectifier bridge circuits 43 and 45 are poled to produce dc currents of the same sense.

The series connected rectifier bridge circuits 43 and 45 auctioneer the applied currents so that the larger of the two is applied to the sensing resistor 23. This auctioneering function is explained in U.S. Pat. No. 3,689,801. Briefly this auctioneering function can be described as follows. Assume that the unidirectional output current available from the dc terminals of the bridge circuit 43 is instantaneously larger than the unidirectional current produced at the output terminals of the bridge circuit 45. Under these conditions, the unidirectional output current on the bridge circuit 43 will instantaneously flow through only two of the diodes which form part of the bridge circuit 43 and the other two diodes will be substantially non-conducting or carry only a negligible current. During the assumed operating conditions, when the output current of the bridge 43 is relatively larger than the instantaneous output current of the bridge 45, the two oppositely positioned paths of two series diodes of the bridge 45 will form two forward current carrying paths for the current from the current transformer 31. During this time the potential across the ac terminals 51 of the bridge circuit 45 is essentially zero. In other words, the bridge 45 is balanced. This will effectively short circuit the ac terminals of the bridge 45 and the current source 25 so that the smaller branch phase current will circulate through the bridge 45. In other words, depending upon the particular operating conditions and the instantaneously different magnitudes of the unidirectional output currents associated with the two current sources which form part of the auctioneering circuit 41, the diodes of the bridge circuits 43 and 45 will at different times assist in converting the alternating current from the associated current transformer to unidirectional current and other times will provide current carrying paths for the unidirectional output current from the bridge circuit associated with the other current source while short circuiting its own current source.

Thus, the larger of the current signal representative of the branch current associated with the circuit breaker and the signal representative of the total current will pass through the sensing resistor 23 and will be responded to by the trip circuit 21. If the sensed current exceeds the rated current of the circuit breaker for a sufficiently long time, the trip circuit will actuate the trip mechanism 19 to open the contacts 17 and thus interrupt the branch current. Thus it is clear that the circuit breaker will respond to either a total current or a branch current, which ever exceeds the rated current of the breaker.

The signal representative to the total current signal applied to each circuit breaker is scaled through proper selection of the windings on the auxiliary transformers to be above the branch current $I_b$ for the breaker. As circuit breakers are removed, the branch current for the remaining breakers will increase until the output of the bridge circuit 45 will exceed that of the bridge circuit 43. In this case, the sensing resistor 23 will see the larger current $I_b$. If too many circuit breakers are removed from the composite breaker 5, $I_b$ could exceed the rated current of the remaining breakers which will then trip as a result of this signal. Thus, if the total current $I_T$ exceeds the composite total rated current of all of the circuit breakers, the individual circuit breakers will be tripped on the signals representative of the total current.

Since the breakers will not necessarily trip simultaneously as initial breakers trip, the branch currents in the remaining breakers will rise and the remaining breakers will trip on which ever current is larger. On the other hand, if the total current remains within limits, but for some reason individual units are removed, the remaining breakers are protected against excessive branch currents and will trip on the branch current signals.

The tolerance on the trip current for the composite breaker system is no worse, and may even be better than with a single breaker. As the initial breaker trips, the current loading on the remaining breakers increases and the final breaker to trip will be momentarily carrying the full load and hence its tolerance will clearly be exceeded. Similarly, when the initial breaker trips on long delay, the current controlled timing is accelerated on the remaining breakers. A point could even be reached where the remaining trip breakers will trip on short delay, and possibly even on instantaneous trip.

As indicated in FIG. 2, the individual trip units and breakers can be modular in form for easy insertion and removal. In the exemplary form of the modular units, each module includes a circuit breaker with its own self protection in the form of branch current transformer 25 and full wave bridge circuit 45 of the branch current. The full wave rectifier bridge circuits 43 for the total current are included in the total current module 27. Since a current source should never be open circuited, each of the representative total current sources are provided with normally open contacts 57 which make to shunt the full wave rectifier bridge circuit 43 before normally closed contacts 59 which connect the bridge to the circuit breaker, module open. These contacts should be activated upon module removal.

Figure 3:
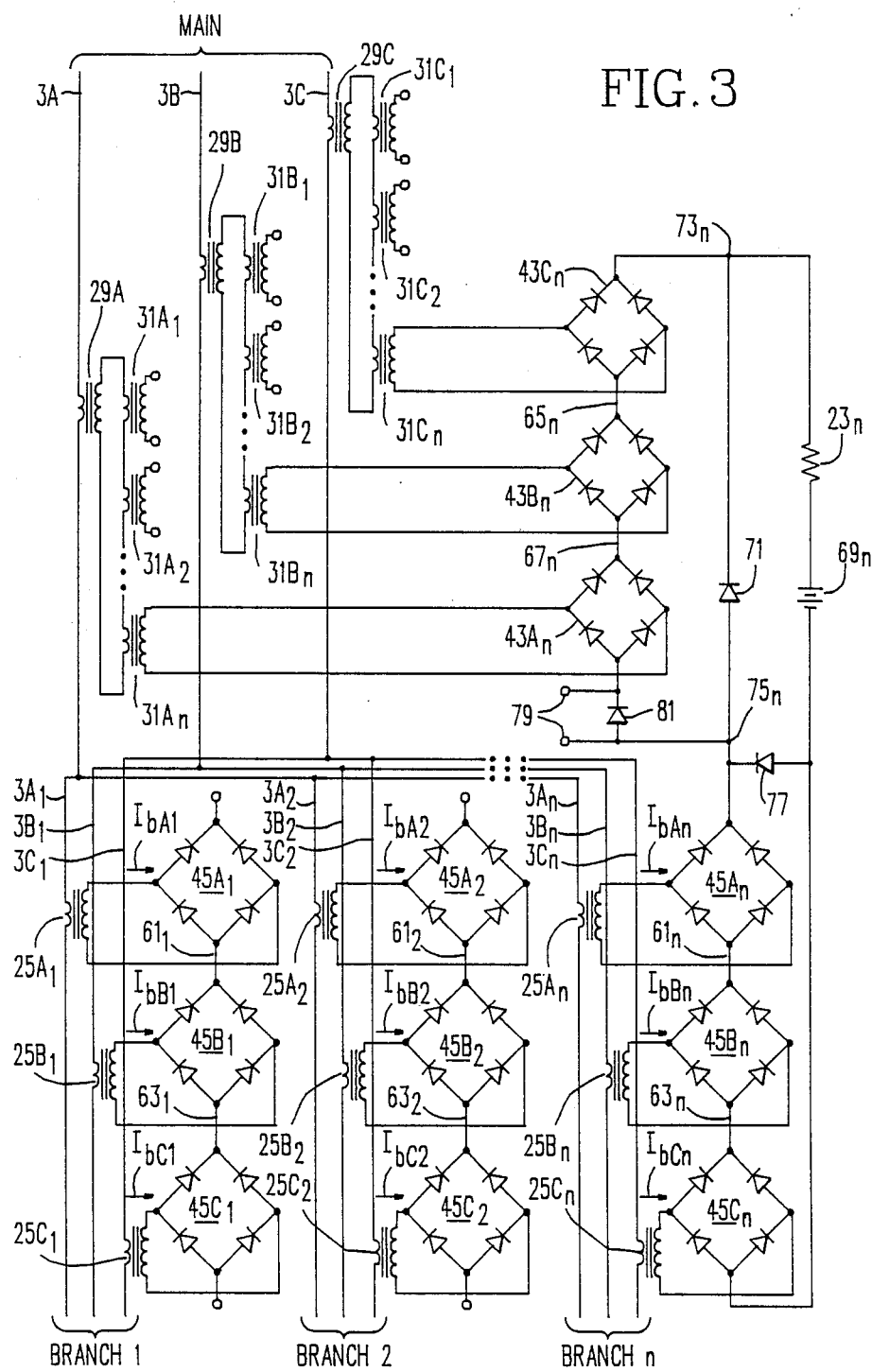
FIG. 3 is a schematic circuit diagram of a multi-phase composite breaker system in accordance with the invention.

FIG. 3 illustrates the application of the invention to a multi-phase power distribution system. In the three-phase system disclosed, the three-phase conductors, 3A, 3B and 3C, are each divided into n branches designated with the subscript 1 through n. Thus, in such a system, there would be n circuit breakers. A signal representative of each branch phase current is generated by a current transformer 25 and converted into a unidirectional current by a full wave rectifier bridge circuit 45. The three phase currents are auctioneered to select the largest by connecting the full wave bridge circuits 45 of the three phases of the associated branch in series with conductors 61 and 63. Thus, for the nth branch, the full wave rectifier bridge circuits $45A_n$, $45B_n$ and $45C_n$ are connected in series to determine the largest of the currents $I_{bAn}$, $I_{bBn}$ and $I_{bCn}$ in the three phases of the nth branch.

Similar to the single phase system disclosed in FIG. 2, a signal representative of the current in each phase A, B, and C of the main conductor generated by the current transformers 29A, 29B, and 29C respectively is divided into n proportionate total current signals by n auxiliary current transformers 31. The three signals representative of the total phase currents for each branch are then auctioneered by connecting full wave rectifier bridge circuits 43, which convert them into unidirectional signals, in series by conductors 65 and 67 as shown in FIG. 3 for the nth branch. Similar three-phase auctioneering circuits for the signals representative of the total currents are provided for each branch, although they are not shown in FIG. 3 for clarity. Similar to the arrangement of the single phase system of FIG. 2, the auctioneering circuit for the branch phase currents is connected in series with the auctioneering circuit for the signals representative of the total phase currents and with the sensing resistor 23 for the associated circuit breaker. Also in series with these components for the circuit breakers powered by the system being protected is the load presented by the individual circuit breaker power supply represented in FIG. 3 by the battery 69. With this circuit arrangement, the largest of the three branch phase currents and the three signals representative of the total phase currents flows through the sensing resistor 23. As in the case of the single phase system described above, two of the opposed diodes in the bridge circuit rectifying the largest of the current signals are conducting while the other two diodes in that bridge carry little or no current. The diodes of all of the remaining bridges are all forward biased to provide parallel paths for the largest current to pass through the bridge and to effectively short circuit the smaller current source associated therewith.

It is preferred that the total current bridges 43 be shunted by a diode 71 poled to pass current from the branch current bridge circuits 45. The purpose of this is to reduce the burden of all of the diodes in the total current bridges 43 which the branch current sources 25 see. These current transformers 25 are small in order to physically fit within the circuit breaker and have difficulty accurately sustaining the measured current with too large a burden. That the signals representative of the total phase currents and the branch phase currents are auctioneered by the diode 71 may not be obvious. First, consider the largest signal representative of a total current greater than the largest branch current, which would be normal for a properly functioning system. Assuming for a moment that the diode 77 is not present, the largest current representative of a total phase current enters at junction 73, goes through the sensing resistor 23 and load 69 and then through the bridges 45 effectively shorting each smaller current source as described above, and returns through junction 75. Under these circumstances the diode 71 is reversed biased. If, for example, too many of the breaker modules have been removed from service, then the branch current would exceed the current representative of the total phase current. In this case, the largest branch current forward biases the diode 71 and thus shunts the bridges 43 so that the branch current sources are prevented from seeing the burden of the several diode drops in the total current bridge circuits 43. The diode 71 switches from forward to reverse bias when the largest total phase current exceeds the largest branch phase current. This transition should be sharp since the sources are current sources which tend to and will develop whatever voltage is required. The primary and auxiliary total current transformers 29 and 31 must be capable of driving higher burdens than those of the branch current sources 25 in the standard breaker modules. However, the burden for these total current transformers could also be reduced by a diode 77 similar to the diode 71 but shunting the bridge circuits 45, although this additional shunt diode is not required.

If desired, a pair of test jacks 79 can be provided into which a test signal can be injected to test the circuit breaker in a manner similar to that discussed in U.S Pat. Nos. 3,852,660 and 3,924,160. This test signal is injected across a diode 81 poled the same as the diodes in the bridges 43 and 45 to prevent application of a reverse polarity of the test signal. This diode 81 also serves to auctioneer the test signal with the branch current signals and the proportionate total current signals in a manner which is evident from the explanation of the operation of the diode 71 above.

Each of the n breaker modules must be rated at more than 1/n of the rated total current, $I_T$, ideally provided by n modules. This, of course, must be done to allow for some "current hogging", and is common practice for paralleled cables and SCRs. The rated full load current of each branch module, $I_b$ should be: $I_b = G(I_T/n)$, where n is the number of branch modules, $I_T$ is the rated full load total current of the composite breaker and G is the branch derating factor, with G greater than one. Actually, it is this derating and the fact that the full load current is seldom, if ever, required at the worst case temperature which that gives this scheme such flexibility. As discussed above, this scheme also actually provides us with a statistically narrower time band tolerance in the critical overload region than would be provided by a single breaker solution.

Thus, the invention provides a circuit breaker system in which each individual breaker in the composite breaker is protected from current hogging while providing the composite protection to the load/source, since each trip unit is looking at its own breaker module current as well as the composite breaker or total current. Also, one or more breaker modules can be removed from the composite breaker, for instance for inspection or routine maintenance, without either loss of protection or service. While the ability to do this depends upon the actual load current with respect to $I_T$, and n, the capability to do this has a decided advantage over a conventional single breaker solution in critical applications. Furthermore, one could load-shed to keep a partially dismantled composite main breaker below its rating until another standard module can be inserted. This is clearly a better option than having a total outage until a special breaker could be inserted. An additional advantage of the invention is that while the large main breaker sees much less service, i.e., fewer operations, than its smaller counterparts, the composite breaker of the invention is made up of modules each designed for the rough life of a frequently used feeder breaker.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A composite circuit breaker system for a main electrical conductor carrying a total current, said composite circuit breaker system comprising:

means dividing the main conductor into a plurality of paralleled branch conductors, each of which carry a branch current which is a proportionate share of the total;

a separate circuit breaker connected in each branch conductor to selectively interrupt the branch current therein;

means associated with each circuit breaker generating a branch current signal representative of the current in the branch in which the circuit breaker is connected; and means generating a signal representative of the total current signal for application to each circuit breaker;

said circuit breakers including circuit means responsive to both the branch current signal and the signal representative of the total current to interrupt said branch current when either of the branch current signal and the signal representative of the total current exceeds a specified value.

2. The composite circuit breaker system of claim 1 wherein said circuit means responsive to the branch current signal and signal representative of the total current comprises means auctioneering said branch current signal and said signal representative of the total current to select the larger of the two signals, and a trip signal responsive to the selected signal.

3. The composite circuit breaker system of claim 2 wherein said means generatrng said signal representative of the total current comprises:

total current transformer means having a primary winding connected in the main conductor and a secondary winding;

a plurality of auxiliary current transformers, one for each circuit breaker, each having a primary winding all of which are connected in series with the secondary winding of the total current transformer, and a secondary winding in which is generated said signal representative of the total current.

4. The composite breaker system of claim 3 wherein said auctioneering means comprises:

a branch current rectifier bridge circuit having ac terminals to which said branch current signal is applied, and having dc terminals;

a total current rectifier bridge circuit having ac terminals to which said signal representative of the total current is applied and having dc terminals; and means connecting the dc terminals of said branch current rectifier bridge circuit in series with the dc terminals of said total current rectifier bridge circuit.

5. The composite circuit breaker system of claim 4 including a diode shunting the dc terminals of one of said rectifier bridge circuits and being poled to be forward biased by the dc current from the other rectifier bridge circuit.

6. The composite circuit breaker system of claim 5 wherein said one rectifier bridge circuit is said total current rectifier bridge circuit.

7. The composite circuit breaker system of claim 5 including diodes shunting the dc terminals of each of said rectifier bridge circuits and poled to be forward biased by the other rectifier bridge circuit.

8. The composite circuit breaker system of claim 1 wherein said main conductor is a multi-phase conductor carrying a multi-phase total current, wherein said dividing means divides said main conductor into a plurality of paralleled multi-phase branch conductors each of which carries a multi-phase branch current, wherein said circuit breaker comprise multi-phase circuit breakers connected in each multi-phase branch conductor to selectively interrupt the multi-phase branch current therein, wherein said branch current signal generating means generates a branch current signal representative of each of the phase currents in said multi-phase branch conductor in which the circuit breaker is connected and wherein said means generating said signal representative of the total current supplies signals for each circuit breaker representative of each phase current in said multi-phase total current.

9. The composite circuit breaker system of claim 8 wherein said circuit means comprises means auctioneering said branch phase current signals and said signals representative of the total phase currents to select the largest of these signals, and trip circuit means responsive to the selected signal.

10. The composite circuit breaker system of claim 9 wherein said auctioneering means includes a rectifier bridge circuit for each branch phase current having ac terminals to which said branch phase current signal is applied and having dc terminals, said dc terminals of each of the branch phase current rectifier bridge circuits being connected in series and poled to generate dc currents of the same sense, a diode in series with said branch phase current rectifier bridge circuits and poled to be forward biased by the rectified branch phase currents, means selecting the largest of said signals representative of the total phase currents, and means connected across said diode to inject said selected signal representative of the largest total phase current in series with said branch phase current bridge circuits.

11. The composite breaker system of claim 10 wherein said means selecting the largest of said signals representative of the total phase currents comprises total phase current rectifier bridge circuits having ac terminals to which said signals representative of the total phase currents are applied and having dc terminals, said dc terminals of said total phase current rectifier bridge circuits being connected in series in the same sense with each other and with the dc currents generated by the branch phase current rectifier bridge circuits.

12. The composite circuit breaker system of claim 11 wherein said means for generating said signals representative of the total phase current comprises for each phase, a total phase current transformer having a primary winding connected in the the main conductor for the phase and having a secondary winding, and a plurality of auxiliary current transformers, one for each circuit breaker, and each having a primary winding all of which are connected in series with the secondary winding of the total phase current transformer, and a secondary winding in which is generated said signal representative of the total phase current.

* * * * *